United States Patent [19]
Otto et al.

[11] 4,059,286
[45] Nov. 22, 1977

[54] WHEEL SUSPENSION FOR MOTOR VEHICLES

[75] Inventors: Heinz Otto, Wolfsburg; Bernhard Ilsemann, Weddel, both of Germany

[73] Assignee: Volkswagenwerk Aktiengesellschaft, Wolfsburg, Germany

[21] Appl. No.: 705,003

[22] Filed: July 14, 1976

[30] Foreign Application Priority Data

Aug. 18, 1975 Germany .............................. 2536060

[51] Int. Cl.² .............................................. B60G 3/20
[52] U.S. Cl. .................................... 280/673; 280/691
[58] Field of Search ..................... 280/673, 96.1, 660, 280/670, 672, 688, 690, 691, 696, 693

[56] References Cited

U.S. PATENT DOCUMENTS 2,533,950  12/1950  McCormick .......................... 280/660

FOREIGN PATENT DOCUMENTS 1,071,500  12/1959  Germany ............................. 280/691

*Primary Examiner*—Philip Goodman
*Attorney, Agent, or Firm*—Spencer & Kaye

[57] ABSTRACT

A wheel suspension for a motor vehicle of the type in which a plurality of transverse, longitudinal or oblique control arms in communication with the wheel supports of the vehicle are articulated to a subframe which is releasably fastened to the vehicle chassis. The bearing bolt of at least one linkage bearing of each control arm articulated to the subframe simultaneously serves to fasten the subframe to the vehicle chassis.

8 Claims, 5 Drawing Figures

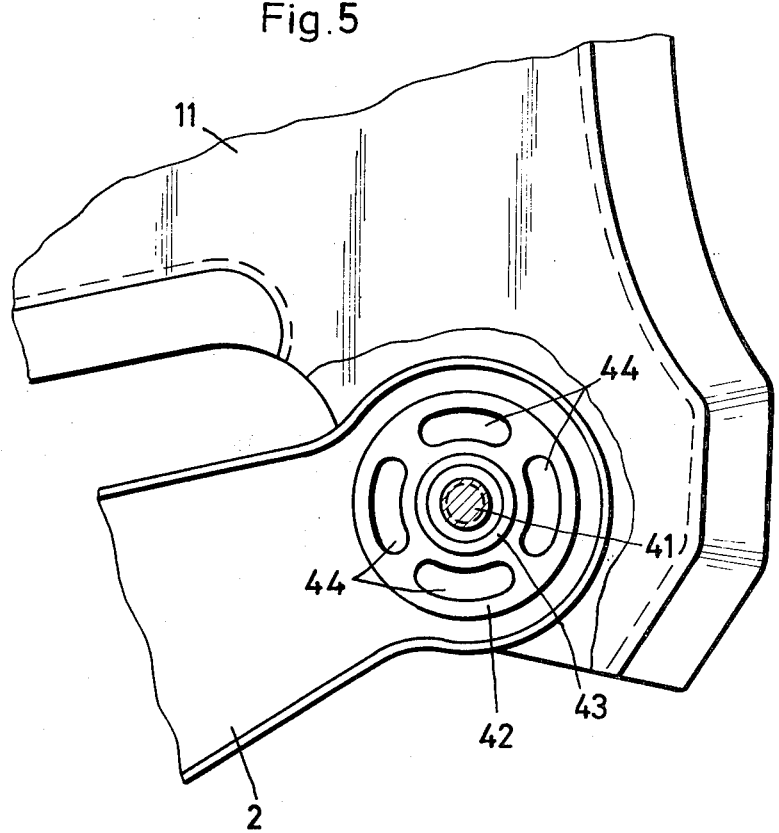

4,059,286

WHEEL SUSPENSION FOR MOTOR VEHICLES

BACKGROUND OF THE INVENTION

The present invention relates to a wheel suspension for motor vehicles in which the transverse, longitudinal or oblique control arms which are in communication with the wheel supports of the vehicle wheels are articulated to a subframe which is removably fastened to the vehicle chassis.

In motor vehicle manufacuture it has been the custom for a long time to fasten, possibly required, special subframes or equalizers to the chassis so as to provide bearing and other supports for the articulation of the wheel steering control arms or even for the attachment of the engine at points in the vehicle which would otherwise be unsuitable. Depending on the design of the subframes they are fastened to the chassis by means of two, three or more screw connections. Special bearing side surfaces are provided in the subframe for the transverse, longitudinal or diagonal control arms fastened thereto in which the horizontally disposed bearing bolts of the control arm bearings are mounted.

SUMMARY OF THE INVENTION

It is the object of the present invention to improve a wheel suspension of the above-mentioned type and in particular to design it so that structural expenditures are reduced.

This is basically accomplished according to the present invention in that the bearing bolt of at least one linkage bearing of each control arm articulated to the subframe simultaneously serves to fasten the subframe to the vehicle chassis. In this manner the expenditures for fastening the subframe to the vehicle chassis are noticeably reduced because at least two of the otherwise required fastening points are eliminated.

In an advantageous embodiment of the present invention an at least approximately vertically oriented bearing bolt is provided which is fastened to the vehicle chassis so as to pass through a bore in the subframe as well as through a bearing bore in the control arm. Preferably a rubber-metal bearing is provided which is inserted into a bearing eyelet provided in the bore of the control arm, and the bearing bolt passes through the inner metal bushing of the rubber-metal bearing.

In a preferred embodiment of the invention, the subframe is provided, in the area where it is fastened to the vehicle chassis, with a pocket-type opening into which the linkage bearing of the control arm is inserted so that both frontal or end faces of the inner bushing of the associated rubber-metal bearing contact the subframe. This assures a secure and particularly stable bearing for the control arm.

According to a further feature of the invention, the bearing bolt which simultaneously serves to fasten the subframe to the chassis is designed as a threaded bolt and is screwed into a threaded plate which is releasably mounted in a release mechanism fastened to the vehicle chassis. This release mechanism preferably includes a member with a generally U-shaped cross-sectional profile whose two arms are upwardly directed and welded to the vehicle chassis and whose back or connecting portion is provided with a slit which extends in the direction of the vehicle and is open in the direction toward the rear of the vehicle. The threaded plate rests on the upper surface of the back or connecting portion of the U-shaped member between the arms thereof so as to be laterally guided by these arms, and the bearing bolt passes through the slit to engage the threaded plate. With such a structural design there results the significant advantage that the vertically oriented bearing bolt will be able to slide out of the slit of the release mechanism together with the subframe and the control arm during a head-on collision of the vehicle so that the danger of deformation of the passenger area is reduced.

BRIEF DESCRIPTION OF THE DRAWINGS

FIG. 5 is a detail sectional plan view of the bearing arrangement by which the subframe and the transverse control arm of the wheel suspension are to be fastened to the vehicle chassis.

DETAILED DESCRIPTION OF THE PREFERRED EMBODIMENT

Figure 1:
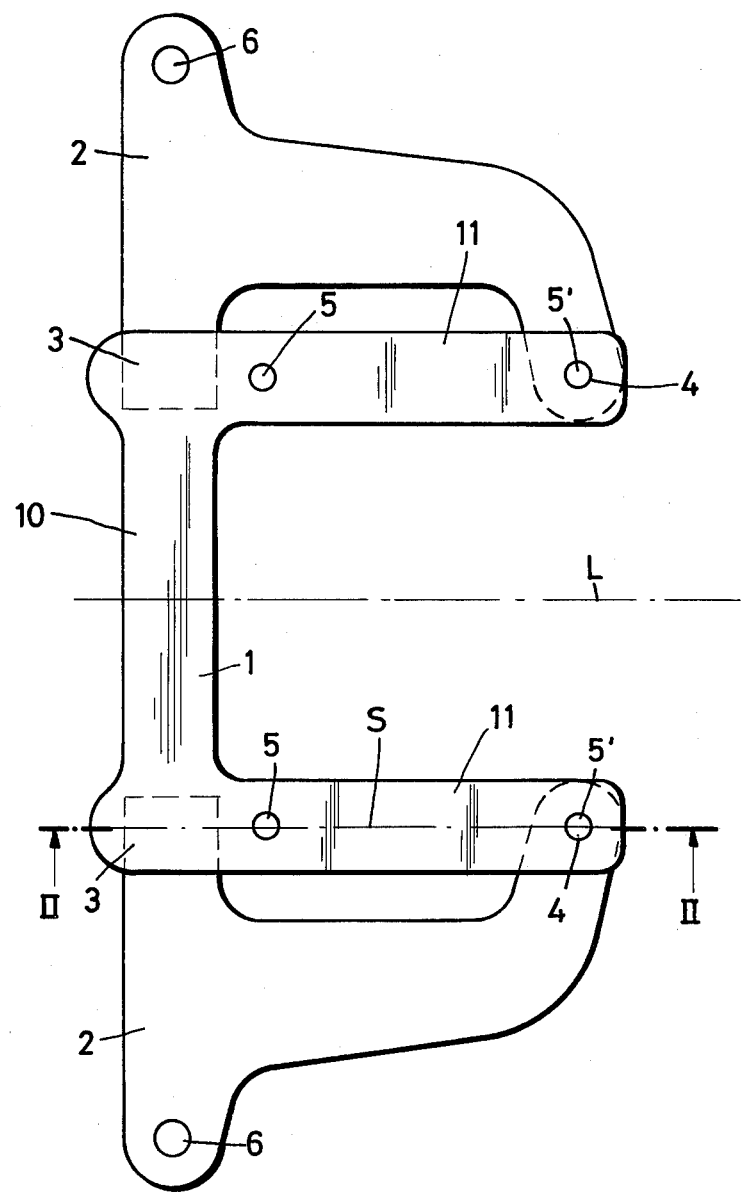
FIG. 1 is a schematic top view of a subframe which is to be fastened to the vehicle chassis, with a transverse control arm of the wheel suspension articulated thereto according to the invention.

Referring now to FIG. 1, there is shown a subframe 1 which is designed in the conventional manner to be symmetrical with respect to the center line of the vehicle which is shown in dashed lines and marked L. The subframe 1 substantially comprises two arms 11 which extend, at least approximately, in the longitudinal direction of the vehicle and are connected together via a back or connecting portion 10 which is oriented transversely to the longitudinal direction of the vehicle. In the illustrated embodiment, the subframe 1 is provided with four bores or the like 5 and 5' through which the subframe can be fastened by means of special screw or threaded connections or the like to the vehicle chassis (not shown in this figure). With the use of elastic bearing elements, two transverse or track control arms 2, which in a conventional manner are in the form of triangular linkages, are articulated to subframe 1. The frontal linkage bearings 3, when seen in the forward direction of the vehicle, are provided in the customary manner as radial bearings whose bearing axes coincide with the associated pivot axes of the transverse control arms 2. However, the rear linkage bearings 4, when seen in the forward direction of the vehicle, are designed and arranged, according to the invention so that their bearing bolts simultaneously serve for fastening the subframe 1 to the vehicle chassis 9. In the illustrated embodiment these bearings 4 are shown as vertically oriented bearings.

Figure 2:
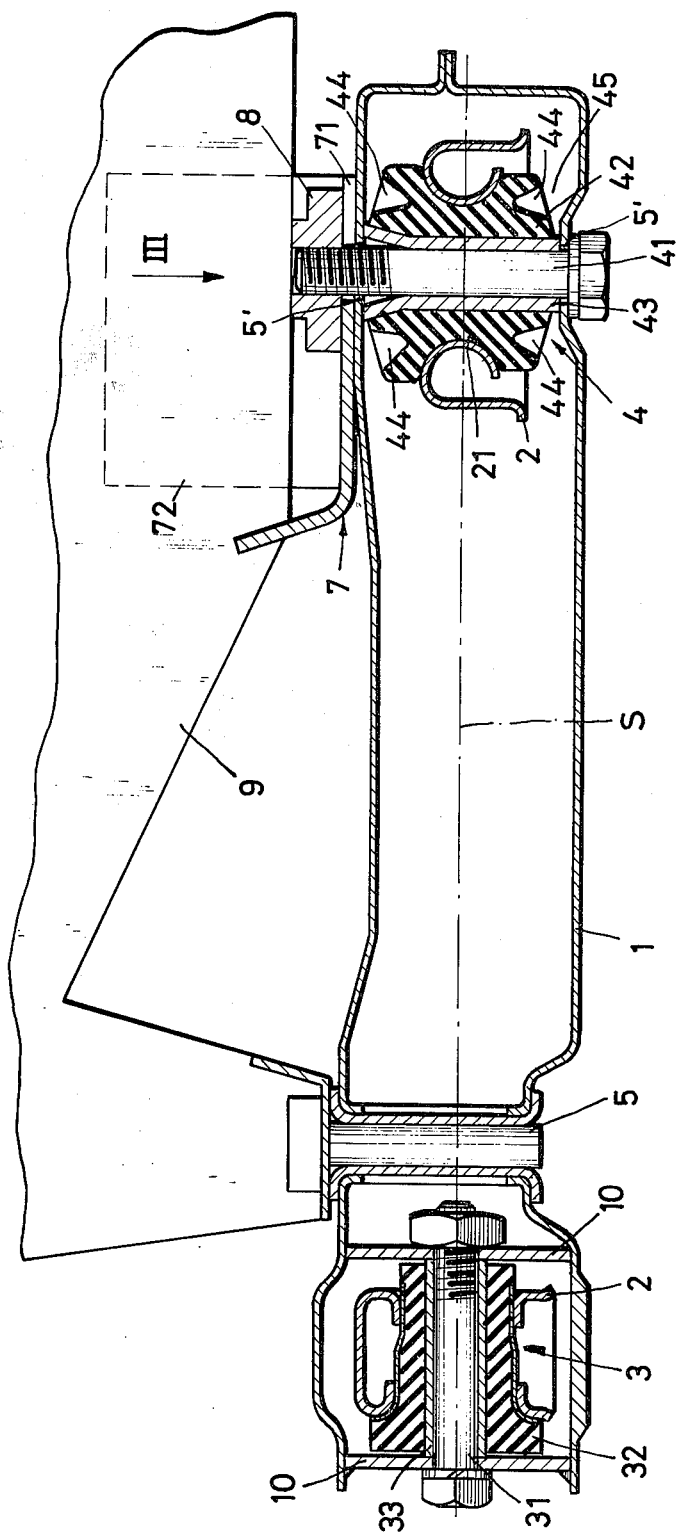
FIG. 2 is a sectional view along the line II-II of FIG. 1.

As can be seen in FIG. 2, the subframe 1 is fastened to the vehicle chassis 9 by means of an at least approximately vertically oriented bolt (not shown) which passes through the front bore 5 of subframe 1 and by an at least approximately vertically oriented bearing bolt 41 which is fastened to the vehicle chassis 9 in a desired manner, and which simultaneously passes through the rear bore 5' in subframe 1 as well as a bearing bore disposed in control arm 2. The bore of the control arm 2 through which the bolt 41 passes is provided with a bearing eyelet 21 into which is inserted an rubber-metal bearing including a rubber element 42 and an inner metal bushing 43 through which the bearing bolt 41 passes. It can be seen that the bearing bolt 41 of the rear linkage bearing 4 extends at least approximately perpendicularly to the pivot axis S of the transverse bearing. In order to assure a sufficiently wide pivoting range for the control arm 2 about the axis S, the rubber element 42 of the rear linkage bearing 4 is provided with pocket-shaped recesses 44 in its frontal surfaces. The subframe 1 in the illustrated embodiment is designed as a shell-type element, i.e., with dual spaced opposed walls. In the area of its rear fastening points to the chassis, i.e., in the area of the bores 5', the subframe 1 is provided with pocket-shaped openings 45 into which the rear linkage bearing 4 of the control arm 2 is inserted with the end or frontal faces of the inner metal bushing 43 contacting the inner surface of the adjacent top and bottom walls of the subframe 1. The inner bushing 43 of the rubber-metal bearing 42-43 of this linkage bearing 4 is thus enclosed at top and bottom by the subframe 1 so that a secure and particularly stable bearing results, rather than a floating bearing.

Figure 3:
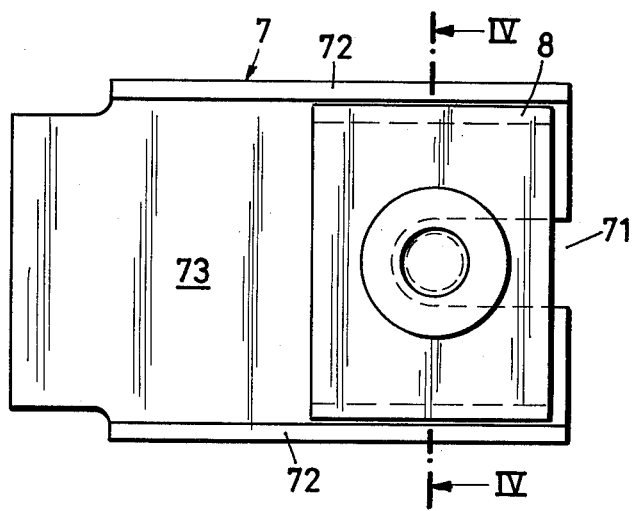
FIG. 3 is a detail sectional view of the wheel suspension in the area where the subframe is fastened to the vehicle chassis in a view of the arrow III of FIG. 2.
Figure 4:
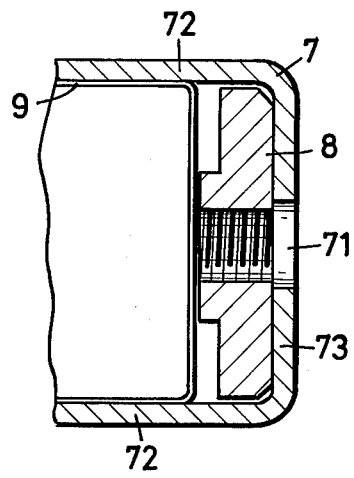
FIG. 4 is a sectional view along the line IV—IV of FIG. 3.

In the illustrated embodiment the bearing bolt 41 is a threaded bolt which is screwed into a threaded plate 8 mounted on the vehicle chassis 9. According to a preferred feature of the invention, this threaded plate 8 is not securely fastened to the chassis 9 but rather is mounted in a particularly advantageous manner in a special release device 7 which — as can be seen in FIGS. 3 and 4 — comprises a metal-member having a U-shaped profile, in cross section, whose arms 72 are upwardly directed and welded to the chassis 9 and whose back or connecting portion 73 is provided with a longitudinal slit 71 which is open at one end. The device 7 is welded to the chassis 9 so that the slit 7 is directed in the longitudinal direction of the vehicle and is open towards the rear of the vehicle. The threaded plate 8 rests on the upper surface of the back 73 of the U-shaped profile between the arms 72 and is laterally guided by same. The vertically oriented bearing bolt 41 extends through the slit opening 71 and is engaged in threaded plate 8.

With this type of fastening of bearing bolt 41 to the vehicle chassis 9, the vertically oriented bearing bolt 41 will slide to the rear out of the slit opening 71 together with the plate 8, the subframe 1 and the control arm 2 when the vehicle is in a collision, so that the danger of deformation of the passenger area is reduced. In order to facilitate the release of bearing bolt 41, plate 8 and subframe 1 with control arm 2 connected thereto, it is advantageous to provide a lubricant between the member 7 and the threaded plate 8 and between member 7 and the subframe 1.

As can be further seen in FIG. 2, the front linkage bearings 3, when seen in the forward direction, are designed, as is the custom, as radial bearings with rubber-metal bearings and an at least approximately horizontal bearing axis, i.e., axis S. The rubber-metal bearing of the bearing 3 of control arm 2, which comprises substantially a rubber element 32 and an inner bushing 33, is axially biased and mounted, by means of a screw-type bearing bolt 31, to two bearing walls of the back or connecting portion 10 of the subframe 1.

Referring now to FIG. 5, there is shown a plan view of the bearing eyelet 21 and the rubber-metal bearing 42 – 44 on the end of the transverse control arm 2 being inserted into the pocket-shaped opening 45 (FIG. 2) of the subframe 1.

The upper wall of the shell-type subframe shown in FIG. 2 is left out in the area of bearing 4 to give a better look on to the bearing.

The rubber-metal bearing 42 – 44 has a rotation symmetrical shape and includes a rubber element 42 and an inner cylindrical metal bushing 43 through which the bearing bolt 41 passes. As is clearly to be seen in connection with FIG. 2 the rubber element 42 is pressed into the vertically extending bearing eyelet 21.

The bearing eyelet 21 may be made, for instance, by stamping a hole into the sheet of the transverse control arm and by then turning down the rim of said hole thereby producing a comparatively large contact surface for the pressed rubber element 42. Because of the elasticity of the rubber element 42 the transverse control arm 2 can pivot about the axis S though the bearing bolt 41 by which the rear linkage bearing 4 is fastened to the vehicle chassis 9 extends at least approximately perpendicuarly to said pivot axis S. The upper and lower frontal surfaces of the rubber element 42 are provided with several pocket-shaped recesses 44 thereby increasing the elasticity of the linkage bearing 4 to assure a sufficiently wide pivoting range for the transverse control arm 2.

In the shown embodiment of the invention there are provided in each case four such recesses. It will be understood that there may be less or more recesses to assure the required elasticity.

The present invention has been explained for the embodiment of a wheel suspension with transverse or track control arms in the form of triangular guides. It is understood that the advantages of the invention will also be fully effective if other types of control arms are used, e.g., longitudinal or diagonal control arms. In particular, it would be just as possible to use, instead of the control arm in the form of a triangular guide, the conventional combination of push or pull rods, respectively, and a simple control arm, i.e., a control arm with but one point of articulation. In that case the one point of articulation of the control arm or the point of articulation of the push or pull rod, respectively, would be used in the proposed manner to serve simultaneously as the fastening point for the subframe. When other types of control arms are used, the shape of the subframe would of course have to be adapted accordingly.

It will be understood that the above description of the present invention is susceptible to various modifications, changes and adaptations, and the same are intended to be comprehended within the meaning and range of equivalents of the appended claims.

What is claimed is:

1. In a wheel suspension for a motor vehicle in which transverse, longitudinal or oblique control arms in communication with the wheel supports of the vehicle wheels are articulated to a subframe by linkage bearings which include bearing bolts, and said subframe is releasably fastened to the vehicle chassis; the improvement wherein:
   the bearing bolt of at least one said linkage bearing of each said control arm articulated to said subframe simultaneously serves to fasten said subframe to the vehicle chassis.

2. A wheel suspension as defined in claim 1 wherein said bearing bolt which simultaneously serves to fasten said subframe to said chassis is an at least approximately vertically oriented bearing bolt which is fastened to the vehicle chassis and passes through a bore provided in said subframe as well as through a bearing bore provided in said control arm.

3. A wheel suspension as defined in claim 2 wherein: said bearing bore in said control arm is provided with a bearing eyelet; a rubber-metal bearing, includes an inner cylindrical metal bushing and an outer rubber member, is inserted into said bearing eyelet in said control arm; and said bearing bolt passes through said inner bushing.

4. A wheel suspension as defined in claim 3 wherein said subframe has dual spaced walls in the area of its fastening points to said vehicle chassis and is provided with a pocket-shaped opening into which the portion of said control arm provided with said bearing bore and said rubber-metal bearing are inserted; and wherein each of the two frontal faces of said inner bushing of said rubber-metal bearing contacts the adjacent wall of said subframe.

5. A wheel suspension as defined in claim 4 wherein said control arm is a transverse control arm with a substantially triangular shape and is articulated to said subframe by means of front and rear linkage bearings; and wherein said bearing bolt which simultaneously serves to connect said subframe to said chassis is the bearing bolt of said rear linkage bearing.

6. A wheel suspension as defined in claim 4, wherein said bearing bolt is a threaded bolt; and further comprising means mounted on said chassis for threadingly engaging said bearing bolt, said means including a threaded plate into which said bearing bolt is screwed, and a release device fastened to the vehicle chassis and on which said threaded plate is releasably mounted.

7. A wheel suspension as defined in claim 6 wherein: said release device comprises a metal member having a U-shaped cross-sectional profile whose arms are upwardly directed and are welded to the vehicle chassis and whose connecting portion is provided with a longitudinal slit which is open at one end; said metal-member is fastened to said vehicle chassis so that said slit extends in the longitudinal direction of the vehicle and is open toward the rear of the vehicle; said threaded plate rests on the upper surface of said connecting portion of said U-shaped profile between said upwardly extending arms and is laterally guided thereby; and said bearing bolt passes through said slit and is engaged in said threaded plate.

8. A wheel suspension as defined in claim 7 wherein a lubricant is introduced between said threaded plate and said metal-member and between the said subframe and said connecting portion of said metal-member.

* * * * *

UNITED STATES PATENT AND TRADEMARK OFFICE
CERTIFICATE OF CORRECTION

PATENT NO. : 4,059,286
DATED : November 22, 1977
INVENTOR(S) : Heinz Otto et al

It is certified that error appears in the above—identified patent and that said Letters Patent are hereby corrected as shown below:

In the heading of the patent, under [30] Foreign Application Priority Data, change "Aug. 18, 1975" to --Aug. 13, 1975.

Column 2, line 67, change "an" to --a--.

Signed and Sealed this

Twenty-third Day of May 1978

[SEAL]

Attest:

RUTH C. MASON
Attesting Officer

LUTRELLE F. PARKER
Acting Commissioner of Patents and Trademarks